(12) United States Patent
Thekkeettil et al.

(10) Patent No.: US 12,155,745 B2
(45) Date of Patent: Nov. 26, 2024

(54) SYNCHRONIZED CONTROL OF SENSORS IN AN ETHERNET NETWORK

(71) Applicant: Marvell Asia Pte Ltd, Singapore (SG)

(72) Inventors: Madhusudhan Harigovindan Thekkeettil, Cupertino, CA (US); David Shen, Saratoga, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 18/161,065

(22) Filed: Jan. 29, 2023

(65) Prior Publication Data

US 2023/0224140 A1 Jul. 13, 2023

Related U.S. Application Data

(63) Continuation of application No. 18/150,213, filed on Jan. 5, 2023.

(60) Provisional application No. 63/297,640, filed on Jan. 7, 2022, provisional application No. 63/297,643, filed on Jan. 7, 2022, provisional application No. 63/297,625, filed on Jan. 7, 2022, provisional application No. 63/297,632, filed on Jan. 7, 2022.

(51) Int. Cl.
*H04L 7/10* (2006.01)
*H04J 3/06* (2006.01)

(52) U.S. Cl.
CPC .............. *H04L 7/10* (2013.01); *H04J 3/0661* (2013.01)

(58) Field of Classification Search
CPC ..... H04L 7/10; H04L 12/12; H04L 12/40039; H04L 67/12; H04L 69/28; H04L 2012/40273; H04J 3/0661; H04W 52/0216

See application file for complete search history.

(56) References Cited

U.S. PATENT DOCUMENTS

| | | | |
|---|---|---|---|
| 8,644,352 B1 | 2/2014 | Hutchison et al. | |
| 9,042,411 B1 | 5/2015 | Hutchison et al. | |
| 9,356,721 B2 | 5/2016 | Haulin | |
| 9,391,728 B2 | 7/2016 | Haulin | |
| 11,165,651 B2 | 11/2021 | Fang et al. | |
| 11,538,287 B2 | 12/2022 | Fang et al. | |
| 11,637,713 B1 * | 4/2023 | Razavi Majomard | H04L 69/323 370/241 |

(Continued)

FOREIGN PATENT DOCUMENTS

| | | |
|---|---|---|
| EP | 3614176 A1 | 2/2020 |
| EP | 3651429 A1 | 5/2020 |

OTHER PUBLICATIONS

Wikipedia, "FPD-Link," pp. 1-4, last edited Nov. 21, 2022, as downloaded from https://web.archive.org/web/20221211221359/https://en.wikipedia.org/wiki/FPD-Link.
Wikipedia, "Energy-Efficient Ethernet (EEE)," pp. 1-4, Jun. 12, 2021, as downloaded https://web.archive.org/web/20210623011901/https://en.wikipedia.org/wiki/Energy-Efficient_Ethernet.
Nordman et al., "Energy Efficiency and Regulation," IEEE 802 Tutorial, pp. 1-58, Jul. 13, 2009.

(Continued)

*Primary Examiner* — Jay P Patel

(57) ABSTRACT

An apparatus for controlling a sensor over a network includes a transceiver and a processor. The transceiver is configured to communicate over the network. The processor is configured to receive or generate control data for controlling a sensor, the sensor being connected to the network by a peer device. The processor is further configured to wake-up a link with the peer device in accordance with a schedule, and, during a time period in the schedule in which the link with the peer device is awake, to send to the peer device a packet comprising the control data.

10 Claims, 8 Drawing Sheets

(56) References Cited

U.S. PATENT DOCUMENTS

| | | | |
|---|---|---|---|
| 11,714,478 B1* | 8/2023 | Sedarat | G06F 1/3296 |
| | | | 713/320 |
| 11,721,137 B2 | 8/2023 | Fang et al. | |
| 2010/0183034 A1 | 7/2010 | Kroepfl et al. | |
| 2014/0043954 A1* | 2/2014 | Wang | H04B 3/32 |
| | | | 370/201 |
| 2014/0121898 A1* | 5/2014 | Diab | H04L 67/12 |
| | | | 701/36 |
| 2017/0339653 A1* | 11/2017 | Hui | H04W 56/0065 |
| 2018/0295535 A1* | 10/2018 | Kavars | G06F 1/28 |
| 2020/0081516 A1* | 3/2020 | Zyskind | G06F 3/04883 |
| 2020/0083974 A1* | 3/2020 | Dalmia | H04L 7/0091 |
| 2020/0116502 A1 | 4/2020 | Xu et al. | |
| 2020/0126416 A1 | 4/2020 | Montemurro et al. | |
| 2020/0186414 A1 | 6/2020 | Das Sharma | |
| 2020/0218979 A1* | 7/2020 | Kwon | G06N 3/042 |
| 2020/0252320 A1 | 8/2020 | Zemach et al. | |
| 2020/0293064 A1* | 9/2020 | Wu | G06N 3/045 |
| 2020/0319324 A1* | 10/2020 | Au | H04W 48/16 |
| 2021/0190923 A1 | 6/2021 | Golomedov et al. | |
| 2021/0192867 A1 | 6/2021 | Fang et al. | |
| 2021/0297230 A1 | 9/2021 | Dror et al. | |
| 2022/0417083 A1 | 12/2022 | Das Sharma | |
| 2023/0112004 A1 | 4/2023 | Hari et al. | |

OTHER PUBLICATIONS

Hearst Autos Inc, "Adas: Everything You Need to Know", pp. 1-6, Nov. 5, 2021, as downloaded from https://www.caranddriver.com/research/a31880412/adas/.

IEEE Std 802.3ch-2020, "IEEE Standard for Ethernet—Amendment 8: Physical Layer Specifications and Management Parameters for 2.5 Gb/s, 5 Gb/s, and 10 Gb/s Automotive Electrical Ethernet," IEEE Computer Society, pp. 1-207, year 2020.

"Precision Time Protocol," PTP Clock Types, Cisco, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.

Thekkeettil et al., U.S. Appl. No. 18/150,213, filed Jan. 5, 2023.

Steinbaeck et al., A Hybrid Timestamping Approach for Multi-Sensor Perception Systems, 2020 23rd Euromicro Conference on Digital System Design (DSD), IEEE, pp. 447-454, Aug. 26, 2020.

EP Application # 23150699.9 Search Report dated Jun. 6, 2023.

Dror, U.S. Appl. No. 17/976,658, filed Oct. 28, 2022.

Dror, U.S. Appl. No. 17/879,587, filed Aug. 2, 2022.

U.S. Appl. No. 18/150,213 Office Action dated Mar. 14, 2024.

* cited by examiner

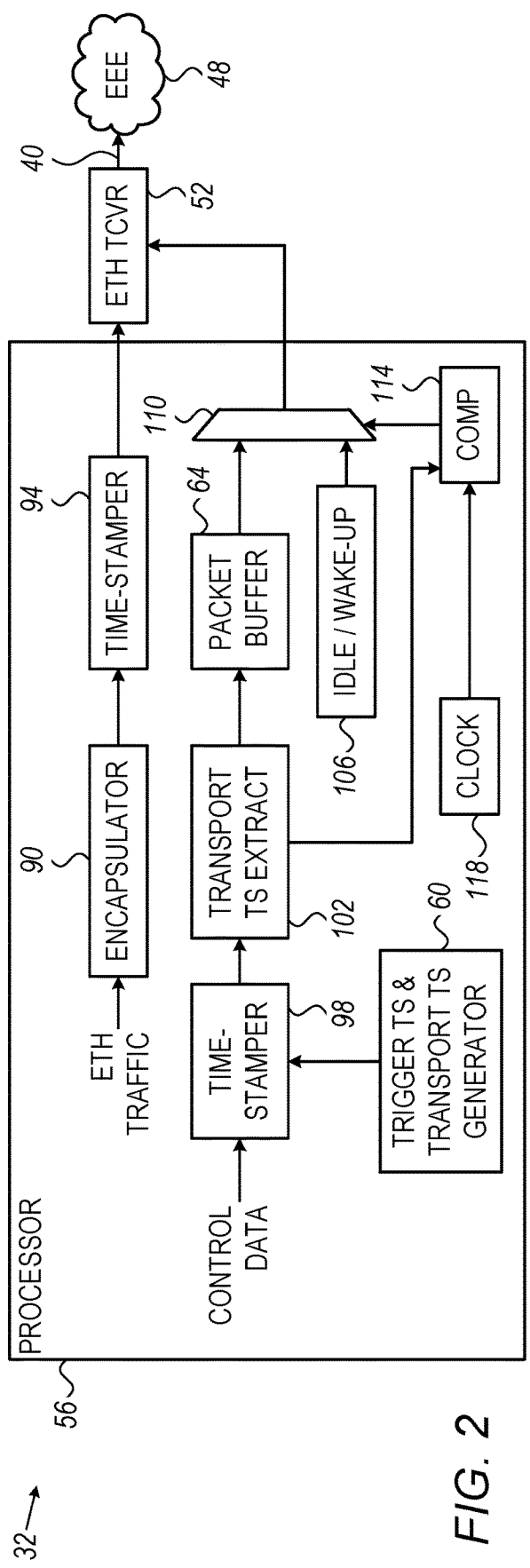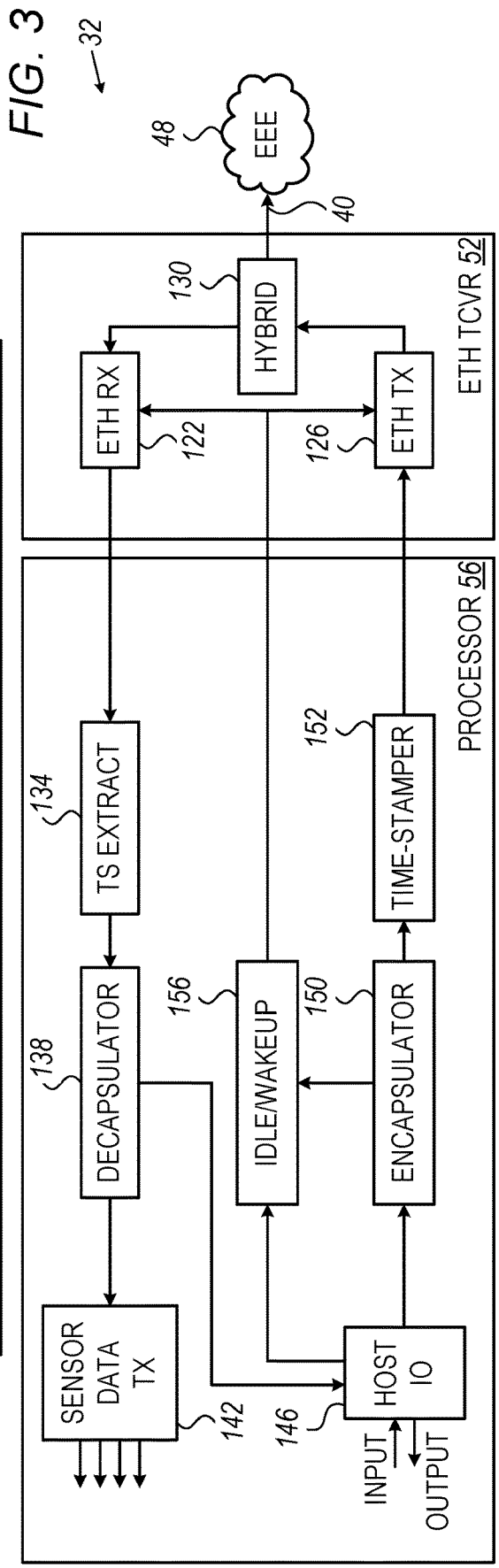

SYNCHRONIZED CONTROL OF SENSORS IN AN ETHERNET NETWORK

CROSS-REFERENCE TO RELATED APPLICATIONS

This application is a continuation of U.S. patent application Ser. No. 18/150,213, filed Jan. 5, 2023, which claims the benefit of U.S. Provisional Patent Applications 63/297,625, 63/297,632, 63/297,640 and 63/297,643, all filed Jan. 7, 2022. The disclosures of these related applications are incorporated herein by reference.

FIELD OF THE DISCLOSURE

The present disclosure relates generally to Ethernet communication, and particularly to methods and systems for sensor synchronization over Ethernet networks.

BACKGROUND

Various systems and applications, such as automotive systems and industrial control systems, employ sensors that are connected to an Ethernet network. The sensors send the data they acquire, and receive control commands, over the network. Ethernet networks in such systems sometimes use Energy-Efficient Ethernet (EEE) protocols to reduce power consumption. EEE is specified, for example, in IEEE Standard 802.3ch-2020, entitled "IEEE Standard for Ethernet—Amendment 8: Physical Layer Specifications and Management Parameters for 2.5 Gb/s, 5 Gb/s, and 10 Gb/s Automotive Electrical Ethernet," July, 2020, which is incorporated herein by reference.

The description above is presented as a general overview of related art in this field and should not be construed as an admission that any of the information it contains constitutes prior art against the present patent application.

SUMMARY

An embodiment that is described herein provides an apparatus for controlling a sensor over a network. The apparatus includes a transceiver and a processor. The transceiver is configured to communicate over a network. The processor is configured to receive or generate control data for controlling a sensor connected to the network, to generate a packet including (i) the control data and (ii) a trigger timestamp indicative of a future time at which the control data is to be provided to the sensor, and to transmit the packet using the transceiver over the network.

In some embodiments, the processor is configured to set the future time to exceed a maximal latency of the network between the apparatus and the sensor.

In an example embodiment, the processor is further configured to wake-up a peer device in accordance with a schedule, to include in the packet a transport timestamp, the transport timestamp indicative of an additional future time at which, in accordance with the schedule, a link with the peer device will be awake, and to send the packet to the peer device at a transmission time corresponding to the additional future time.

In an embodiment the network includes an Ethernet network.

There is additionally provided, in accordance with an embodiment that is described herein, an apparatus for controlling a sensor over a network. The apparatus includes a transceiver, a sensor interface, a memory and a processor. The transceiver is configured to communicate over a network. The sensor interface is configured to communicate with a sensor over a local link that does not traverse the network. The processor is configured to receive from the network, using the transceiver, a packet including (i) control data for controlling the sensor and (ii) a trigger timestamp indicative of a future time at which the control data is to be provided to the sensor, to buffer at least the control data in the memory until a delivery time corresponding to the future time indicated in the trigger timestamp, and, at the delivery time, to retrieve the control data from the memory and to send the control data to the sensor over the local link.

In some embodiments the network includes an Ethernet network.

There is also provided, in accordance with an embodiment that is described herein, an apparatus for controlling a sensor over a network. The apparatus includes a transceiver and a processor. The transceiver is configured to communicate over a network. The processor is configured to receive or generate control data for controlling a sensor, the sensor being connected to the network by a peer device, to wake-up a link with the peer device in accordance with a schedule, and, during a time period in the schedule in which the link with the peer device is awake, to send to the peer device a packet including the control data.

In some embodiments, the processor is configured to embed a transport timestamp in the packet, the transport timestamp indicative of a future time at which, in accordance with the schedule, the link with the peer device will be awake, and to send the packet to the peer device at a transmission time corresponding to the future time. In an example embodiment, the apparatus further includes a memory, and the processor is configured to buffer the control data in the memory, and, at the transmission time, to retrieve the control data from the memory and to send the control data to the peer device.

In another embodiment, the processor is configured to schedule sending of the packet based on a Quality-of-Service (QoS) metric associated with the control data. In yet another embodiment, the processor is configured to embed a trigger timestamp in the packet, the trigger timestamp indicative of a future time at which the control data is to be provided to the sensor. In some embodiment the network includes an Ethernet network.

There is further provided, in accordance with an embodiment that is described herein, an apparatus for communicating sensor data over a network. The apparatus includes a transceiver, a sensor interface and a processor. The transceiver is configured to communicate over a network. The sensor interface is configured to communicate with a sensor over a local link that does not traverse the network. The processor is configured to receive from the sensor, over the local link, sensor data for sending over the network to a peer device, to generate a packet including (i) the sensor data, (ii) a capture timestamp indicative of a time at which the sensor captured the sensor data, and (iii) a presentation timestamp indicative of a future time at which the sensor data is to be presented by the peer device for subsequent processing, and to transmit the packet using the transceiver over the network to the peer device.

In an embodiment, the processor is configured to set the future time, indicated in the presentation timestamp, to exceed a maximal latency of the network between the apparatus and the peer device. In some embodiments the network includes an Ethernet network.

There is additionally provided, in accordance with an embodiment that is described herein, an apparatus for controlling a sensor over a network. The apparatus includes a transceiver, a memory and a processor. The transceiver is configured to communicate over a network. The processor is configured to receive multiple packets from the network using the transceiver, each of the packets including (i) sensor data captured by a sensor, (ii) a capture timestamp indicative of a time at which the sensor captured the sensor data, and (iii) a presentation timestamp indicative of a future time at which the sensor data is to be presented by the apparatus for subsequent processing, to buffer each of the packets in the memory until a respective retrieval time corresponding to the future time indicated in the presentation timestamp of the packet, and, at the respective retrieval time of each packet, to retrieve the packet from the memory and present the sensor data and the capture timestamp of the packet for subsequent processing.

In some embodiment the network includes an Ethernet network.

There is also provided, in accordance with an embodiment that is described herein, a method for controlling a sensor over a network. The method includes receiving or generating control data for controlling a sensor connected to the network. A packet is generated, the packet including (i) the control data and (ii) a trigger timestamp indicative of a future time at which the control data is to be provided to the sensor. The packet is transmitted over the network.

There is further provided, in accordance with an embodiment that is described herein, a method for controlling a sensor over a network. The method includes communicating packets over a network, and communicating with a sensor over a local link that does not traverse the network. A packet is received from the network, the packet including (i) control data for controlling the sensor and (ii) a trigger timestamp indicative of a future time at which the control data is to be provided to the sensor. At least the control data is buffered in a memory until a delivery time corresponding to the future time indicated in the trigger timestamp. At the delivery time, the control data is retrieved from the memory and the control data is sent to the sensor over the local link.

There is also provided, in accordance with an embodiment that is described herein, a method for controlling a sensor over a network. The method includes receiving or generating control data for controlling a sensor, the sensor being connected to the network by a peer device. A link with the peer device is woken-up in accordance with a schedule. A packet, which includes the control data, is sent to the peer device during a time period in the schedule in which the link with the peer device is awake.

There is additionally provided, in accordance with an embodiment that is described herein, a method for communicating sensor data over a network. The method includes communicating over a network, and communicating with a sensor over a local link that does not traverse the network. Sensor data, for sending over the network to a peer device, is received from the sensor over the local link. A packet is generated, the packet including (i) the sensor data, (ii) a capture timestamp indicative of a time at which the sensor captured the sensor data, and (iii) a presentation timestamp indicative of a future time at which the sensor data is to be presented by the peer device for subsequent processing. The packet is transmitted over the network to the peer device.

There is further provided, in accordance with an embodiment that is described herein, a method for controlling a sensor over a network. The method includes receiving multiple packets from the network using the transceiver, each of the packets including (i) sensor data captured by a sensor, (ii) a capture timestamp indicative of a time at which the sensor captured the sensor data, and (iii) a presentation timestamp indicative of a future time at which the sensor data is to be presented by the apparatus for subsequent processing. Each of the packets is buffered in a memory until a respective retrieval time corresponding to the future time indicated in the presentation timestamp of the packet. At the respective retrieval time of each packet, the packet is retrieved from the memory, and the sensor data and the capture timestamp of the packet are presented for subsequent processing.

The present disclosure will be more fully understood from the following detailed description of the embodiments thereof, taken together with the drawings in which:

BRIEF DESCRIPTION OF THE DRAWINGS

FIGS. 2 and 3 are block diagrams that schematically illustrate alternative implementations of a controller in the system of FIG. 1, in accordance with embodiments that are described herein;

DETAILED DESCRIPTION OF EMBODIMENTS

Figure 1:
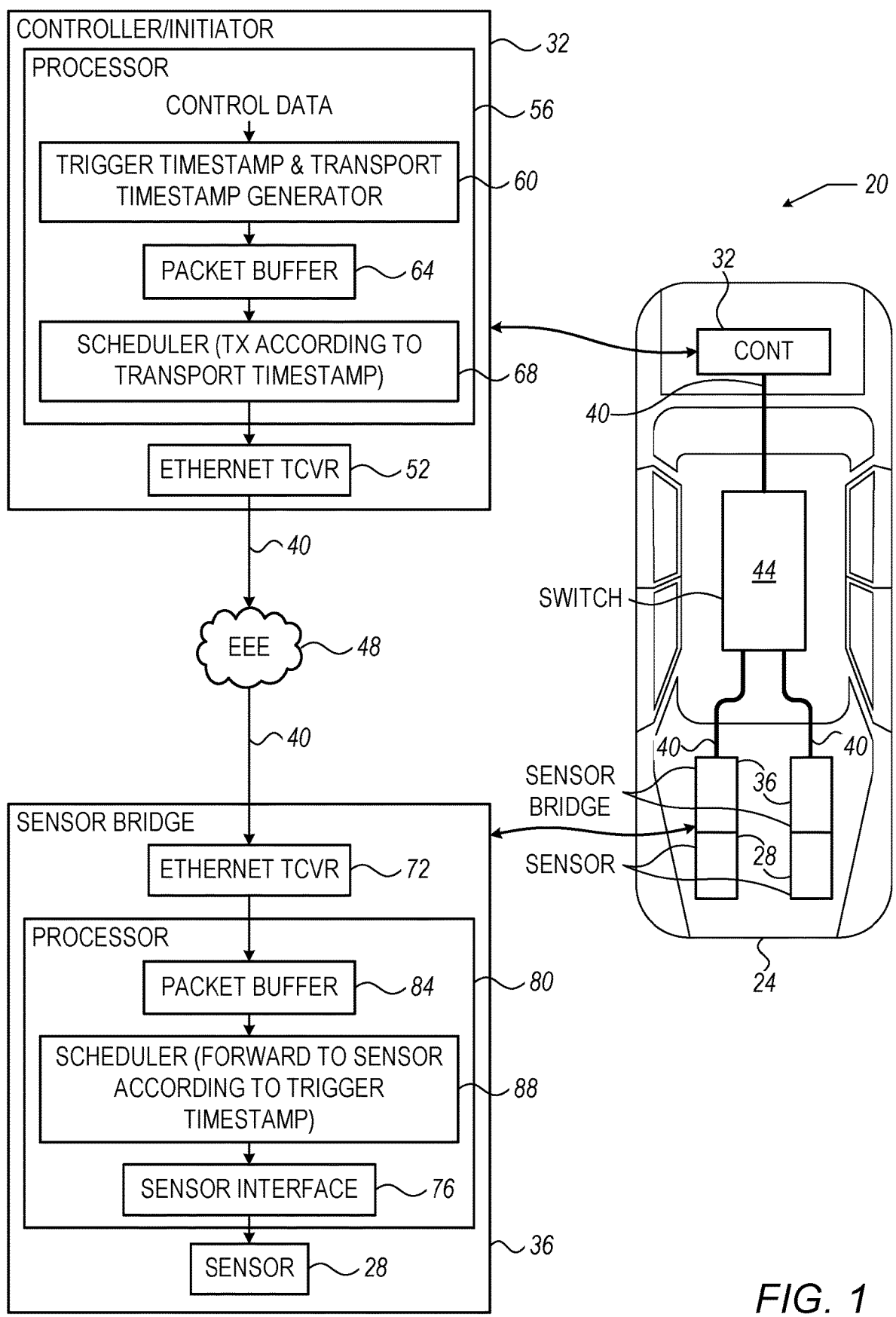
FIG. 1 is a block diagram that schematically illustrates an automotive Ethernet communication system, in accordance with an embodiment that is described herein.

In systems that involve communicating with sensors over a network, it is sometimes required to control a sensor with high time accuracy. For example, in some cases it is required to deliver control data to a sensor (e.g., deliver a command for triggering the sensor to acquire sensor data) at a specific time. In other cases, it is necessary that sensor data captured by a sensor (e.g., an image captured by a camera) be presented for subsequent processing at a specific time. Controlling a sensor over a network with high time accuracy is particularly challenging when the network has a variable latency. When using Energy-Efficient Ethernet (EEE), for example, the propagation time of a packet may vary by several tens of microseconds. The time accuracy requirement, on the other hand, may be on the order of less than one microsecond.

Embodiments that are described herein provide improved systems and methods for controlling sensors over a network with high time accuracy. Embodiments are described in the context of automotive systems in which multiple sensors are connected to an in-vehicle Ethernet network. The disclosed techniques, however, are suitable for use in any other suitable system, e.g., in industrial control systems, and with various types of sensors and surveillance systems. Embodiments are described in the context of Ethernet, and EEE, by way of example. The disclosed techniques, however, are suitable for use in various other types of packet networks. Non-limiting examples of sensors used in automotive systems include video cameras, velocity sensors, accelerometers, audio sensors, infra-red sensors, radar sensors, lidar sensors, ultrasonic sensors, rangefinders or other proximity sensors, and the like.

In some embodiments, a system comprises one or more sensors, and a controller that controls the sensors over an Ethernet network. The controller, also referred to herein as an initiator, may comprise, for example, a system Central Processor Unit (CPU), a Graphics Processing Unit (GPU) or any other suitable type of processor. In some embodiments the controller or initiator may be integrated into a switch of the Ethernet network. A given sensor is typically connected to the network via a "sensor bridge". The sensor bridge communicates with the controller over the network using Ethernet, and with the sensor using one or more local interfaces (also referred to as local links). The type of local interface may vary from one sensor type to another. The link between a sensor and a sensor bridge is considered local in the sense that the link does not traverse the Ethernet network.

In the embodiments described herein, a sensor may be controlled using any of three different mechanisms, referred to as a "trigger timestamp" mechanism, a "transport timestamp" mechanism and a "presentation timestamp" mechanism. The trigger timestamp and transport timestamp mechanisms pertain to the direction from the controller to the sensor. The presentation timestamp mechanism pertains to the direction from the sensor to the controller. The presentation timestamp mechanism is useful, for example, for synchronizing presentation (and subsequent processing) of sensor data captured by multiple different sensors. A given implementation may employ a single mechanism or any combination of mechanisms.

In an embodiment, in the "trigger timestamp" mechanism, the controller receives or generates control data for controlling a sensor. The controller generates and sends to the sensor bridge an Ethernet packet, which comprises (i) the control data and (ii) a trigger timestamp. The trigger timestamp is indicative of a future time at which the control data is to be provided to the sensor. For example, the trigger timestamp may indicate, for example, a system-determined future time at which all image sensors are required to receive control data. The controller typically defines the future time in the packet (the "trigger time") so as to exceed the maximal expected latency of the Ethernet network between the controller and the sensor. In an example embodiment, the controller sets the trigger time to be several milliseconds later than the time at which the packet is generated.

In this manner, the sensor bridge is able to deliver the control data to the sensor exactly at the specified future time, regardless of the variable latency of the Ethernet network. A value for the future time can be a constant fixed delay after sending of the command, depending on requirements of the sensor, or it can be adjusted to synchronize to a particular time interval. For instance, packets can be timed according to a blanking interval of a video sensor by keeping continuous track of the timing of video sensor frames.

The sensor bridge receives the Ethernet packet and buffers the packet, or at least the control data, in memory. Shortly before the trigger time indicated in the trigger timestamp, the sensor bridge retrieves the control data from the memory and sends the control data to the sensor over the local link. The time at which the sensor bridge retrieves the control data from the memory (referred to as "delivery time", slightly preceding the trigger time) is derived from the trigger time indicated in the trigger timestamp, so that the sensor will actually receive the control data at the specified trigger time notwithstanding delays in the sensor bridge and the local interface.

The "trigger timestamp" mechanism described above governs the time at which the sensor bridge delivers the control data to the sensor. The "transport timestamp" mechanism, in contrast, governs the time at which the controller sends the packet carrying the control data to the network.

The time at which the control data is sent to the network is important, for example, when the link between the controller and the sensor bridge is awake only intermittently in accordance with a certain schedule, in order to reduce energy consumption. This is the case, for example, when the controller and the sensor bridge communicate using Energy-Efficient Ethernet (EEE). When using EEE, it is possible to reduce packet propagation latency considerably by sending a packet to the network only at times when the destination sensor bridge is awake.

In the present context, the term "the link is awake" means that the Ethernet transceivers in both the controller and the sensor bridge (referred to as a "link partner" or "peer Ethernet device" of the controller) are active. Deactivating the link by the controller comprises instructing the sensor bridge to deactivate at least its Ethernet transceiver, and may comprise deactivating the Ethernet transceiver of the controller as well. Waking-up (activating) the link by the controller comprises instructing the sensor bridge to activate at least its Ethernet transceiver, and may comprise activating the Ethernet transceiver of the controller.

In an embodiment, in the "transport timestamp" mechanism, the controller generates an Ethernet packet comprising (i) the control data and (ii) a transport timestamp. The transport timestamp is indicative of a future time at which, according to the schedule, the link between the controller and the sensor bridge will be awake. The controller buffers the packet in memory. Shortly before the future time ("transport time") indicated in the transport timestamp, the controller retrieves the packet from the memory and sends the packet to the network, en route to the sensor bridge. The time at which the controller retrieves the packet from the memory (referred to as "transmission time", slightly preceding the specified transport time) is derived from the transport time indicated in the transport timestamp, so that the packet is sent to the network at the specified transport time regardless of delays in the controller.

The "transport timestamp" mechanism enables significant power savings, particularly in asymmetric Ethernet links. This mechanism also provides a deterministic latency for the control data in spite of the use of EEE. This ability also enables synchronizing control of different sensors. The disclosed implementations of the "transport timestamp" mechanism are compatible with existing Ethernet standards.

In an embodiment, in the "presentation timestamp" mechanism, the sensor bridge receives sensor data from a sensor and generates an Ethernet packet comprising (i) the sensor data, (ii) a capture timestamp and (iii) a presentation timestamp. The capture timestamp is indicative of the time at which the sensor captured the sensor data. The presentation timestamp is indicative of a future time ("presentation time") at which the sensor data is to be presented by the controller, e.g., to a user application, for subsequent processing. In an example embodiment, the sensor bridge sets the presentation time to be several milliseconds in the future (relative to the time the packet is generated), to account for any delays in the network.

In this embodiment, the controller receives multiple Ethernet packets from one or more sensor bridges, each packet comprising sensor data, a capture timestamp and a presentation timestamp. The controller buffers the received packets in memory. A given packet is buffered until shortly before the presentation time indicated in the presentation timestamp of that packet. Shortly before the presentation time of a given packet, the controller retrieves the packet from the memory and outputs ("presents") the sensor data and the capture timestamp for subsequent processing. The time at which the controller retrieves the packet from the memory (referred to as "retrieval time", slightly preceding the presentation time) is derived from the presentation time indicated in the presentation timestamp, so that the sensor data will be output from the controller at the specified presentation time notwithstanding delays in the controller. In this manner, the controller can present sensor data originating from different sensors, at times that reflect the actual capture times, even though the network latency varies over time and from one sensor bridge to another.

Various implementation examples of systems, controllers and sensor bridges, which use the disclosed "trigger timestamp", "transport timestamp" and "presentation timestamp" mechanisms are described herein.

FIG. 1 is a block diagram that schematically illustrates an automotive Ethernet communication system 20, in accordance with an embodiment that is described herein. In the embodiment described herein, system 20 is installed in a vehicle 24, and comprises multiple sensors 28 that communicate with, and are controlled by, a controller 32. Controller 32 is also referred to herein as an initiator. In other embodiments (not seen), system may be installed in an industrial network, surveillance network or other suitable network.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like. Controller 32 may comprise any suitable type of processor, e.g., a CPU or a GPU.

Sensors 28 and controller 32 communicate via an Ethernet network comprising multiple network links 40 and one or more Ethernet switches 44. Ethernet links 40 may comprise, for example, twisted-pair cables. Sensors 28 connect to the Ethernet network via one or more sensor bridges 36. A given sensor bridge may connect a single sensor or multiple sensors to the Ethernet network.

Sensor bridges 36, switches 44 and controller 32 may communicate over network links 40 at any suitable bit rate. Example bit rates are 2.5 Gb/s, 5 Gb/s or 10 Gb/s, in accordance with the IEEE 802.3ch-2020 standard. In some embodiments, sensor bridges 36 and controller 32 communicate using EEE, in accordance with IEEE 802.3ch-2020, cited above. Controller 32 and sensor bridges 36 are assumed to be synchronized to some central clock or timebase of system 20, for example using Time-Precision Protocol (PTP).

An inset on the left-hand side of FIG. 1 illustrates an example implementation of controller 32 and sensor bridge 36, in an embodiment. In the present example, controller 32 and sensor bridge 36 communicate over an in-vehicle Ethernet network 48 that supports EEE. FIG. 1 provides a high-level introduction to the "trigger timestamp" and "transport timestamp" mechanisms. Detailed alternative embodiments of controllers and sensor bridges that support these mechanisms are described below with reference to FIGS. 2-7. Embodiments relating to the "presentation timestamp" mechanism are described further below with reference to FIGS. 8 and 9.

In the embodiment of FIG. 1, controller 32 comprises an Ethernet transceiver (TCVR) 52 for communicating over network 48, and a processor 56 that carries out the various controller tasks. Processor 56 comprises, possibly among other components, a trigger-timestamp and transport-timestamp generator 60, a packet buffer 64 and a scheduler 68. Sensor bridge 36 comprises an Ethernet transceiver (TCVR) 72 for communicating over network 48, a processor 80 that carries out the various sensor bridge tasks, and a sensor interface 76 for communicating with sensor 28 over a local link. Sensor interface 76 may exchange control data with sensor 28 using, for example, an Inter-Integrated Circuit ($I^2C$) bus, an Improved Inter-Integrated Circuit ($I^3C$) bus, a General-Purpose Input-Output (GPIO) interface, a Peripheral Component Interconnect express (PCIe) bus, or any other suitable local link. Additionally, sensor interface 76 receives sensor data from sensor 28 using a suitable data interface. Processor 80 comprises, possibly among other components, a packet buffer 84 and a scheduler 88.

In a typical flow, processor 56 receives or generates control data for controlling sensor 28 via sensor bridge 36. Timestamp generator 60 generates an Ethernet packet that comprises (i) the control data, (ii) a trigger timestamp and (iii) a transport timestamp.

The trigger timestamp is indicative of a future time (denoted "trigger time") at which the control data is to be delivered from sensor bridge 36 to sensor 28. The transport timestamp is indicative of another future time (denoted "transport time") at which (i) the link between controller 32 and sensor bridge 36 will be awake according to the EEE schedule between the controller and the sensor bridge, and (ii) the packet is to be sent from controller 32 to network 48.

Processor 56 buffers the Ethernet packet in packet buffer 64. Shortly before the transport time specified in the transport timestamp of the buffered packet, scheduler 68 retrieves the packet from buffer 64 and sends the packet to network 48 using Ethernet transceiver 52.

In sensor bridge 36, Ethernet transceiver 72 receives the Ethernet packet from network 48 and forwards the packet to processor 80. Processor 80 buffers the packet in packet buffer 84. Shortly before the trigger time specified in the transport timestamp of the buffered packet, scheduler 88 retrieves the packet from buffer 84 and sends the control data to sensor 28 using sensor interface 76.

In an embodiment, controller 32 may carry out the above process concurrently for multiple Ethernet packets that convey control data to various sensors 28 via various sensor bridges 36. Similarly, sensor bridge 36 may carry out the above process concurrently for multiple Ethernet packets that convey control data to various sensors 28 connected thereto.

FIG. 2 is a block diagram that schematically illustrates an implementation of controller 32 of system 20, in accordance with an embodiment that is described herein. In the present example, processor 56 of controller 32 comprises an encapsulator 90 and a time-stamper 94 that encapsulate and time-stamp conventional Ethernet traffic.

The additional components of processor 56, at the bottom of FIG. 2, are used for transmitting control data to sensor 28 in accordance with the disclosed techniques. In the embodiment of FIG. 2 these additional components comprise timestamp generator 60, packet buffer 64, a time-stamper 98, a transport-timestamp extractor 102, an idle/wake-up module 106, a data multiplexer (MUX) 110, a comparator 114 and a clock module 118.

Time-stamper 98 receives control data to be delivered to sensors 28. Timestamp generator 60 generates suitable trigger timestamps and transport timestamps for the various control data. Time-stamper 98 encapsulates the control data in Ethernet packets that each comprise (i) control data, (ii) a respective trigger timestamp and (iii) a respective transport timestamp.

Transport-timestamp extractor 102 extracts the transport timestamps from the packets and buffers the packets in packet buffer 64. The extracted transport timestamps will be used later, to initiate transmission of the buffered packets according to the specified transport times.

Idle/wake-up module 106 activates and deactivates the links between controller 32 and the various sensor bridges 36 in accordance with EEE as specified in IEEE 802.3ch-2020, cited above. For a given sensor bridge 36 (referred to in the present context as a link partner or peer Ethernet device of controller 32), idle/wake-up module 106 activates ("wakes-up") and deactivates at least the Ethernet transceiver of the sensor bridge in accordance with a suitable time schedule in order to reduce power consumption. Idle/wake-up module 106 may also activate and deactivate other components, e.g., other components of sensor bridge 36 and/or the Ethernet transceiver of controller 32.

The activation/deactivation schedule is referred to herein as an EEE schedule. The EEE schedule may be decided internally by module 106, or provided to module 106 from an external source. In either case, processor 56 is aware of the time periods in which the link with each sensor bridge 36 is active (awake). Using this information, processor 56 (e.g., timestamp generator 60, or scheduler 68 in FIG. 1) selects each transport time to fall within a future time period during which the corresponding link will be awake.

Clock module 118 synchronizes processor 56 to the central clock of system 20, e.g., using PTP. Comparator 114 compares the transport times of the various buffered packets (as provided by transport-timestamp extractor 102) to the current time (as provided by clock module 118). When the current time matches the transport time of a certain packet (e.g., when the current time is equal to a "transmission time" that slightly precedes the transport time) comparator 114 retrieves the packet from buffer 64 and sends the packet via MUX 110 to Ethernet transceiver 52, for transmission to the appropriate sensor bridge 36.

In some embodiments, processor 56 further reduces power consumption, and increases communication efficiency, by jointly setting the EEE schedule and the transport times of packets. For example, processor 56 may accumulate control data destined to a certain sensor bridge 36. When a sufficient amount of control data has been accumulated, processor 56 may (i) activate the link to the sensor bridge and (ii) set the transport timestamps of the packets destined to that sensor bridge. As another example, processor 56 may wait until slightly before the specified transport time of a certain packet, and then activate the link to the sensor bridge and send the packet. Other scheduling schemes that jointly consider the EEE schedule and the packet transport times are also possible.

FIG. 3 is a block diagram that schematically illustrates another implementation of controller 32 of system 20, in accordance with an alternative embodiment that is described herein. FIG. 3 shows additional detail as to the structure of Ethernet transceiver 52. As seen, in the present example transceiver 52 comprises an Ethernet receiver (RX) 122 that receives Ethernet signals, an Ethernet transmitter (TX) 126 that transmits Ethernet signals, and a hybrid splitter/combiner 130 that couples RX 122 and TX 126 to Ethernet link 40.

For reception, processor 56 of FIG. 3 comprises a timestamp extractor 134 that extracts timestamps from received packets carrying sensor data, a decapsulator 138 that decapsulates the received packets, and a sensor data transmitter 142 that extracts the sensor data and delivers it for subsequent processing. For transmission, processor 56 of FIG. 3 comprises a packet encapsulator that generates Ethernet packets carrying control data, and a time-stamper 152 that adds trigger timestamps and transport timestamps to the packets.

A host I/O interface can be used to simplify the control interface for the sensor with bi-directional signal forwarding across the Ethernet link. Processor 56 of FIG. 3 comprises a host I/O interface 146 and an idle/wake-up module 156. In the present example, the EEE schedules are set by a host external to controller 32. The EEE schedules are provided to processor 56 via host I/O interface 146. In addition, input data on the host I/O interface is encapsulated and forwarded at the time controlled by the external host via I/O interface 146 pin control. Idle/wake-up module 156 activates and deactivates the links to the various sensor bridges as specified in the EEE schedules provided by the host. Output data is extracted from decapsulator 138 in a data stream that is separate from the receiver Tx data.

Figure 4:
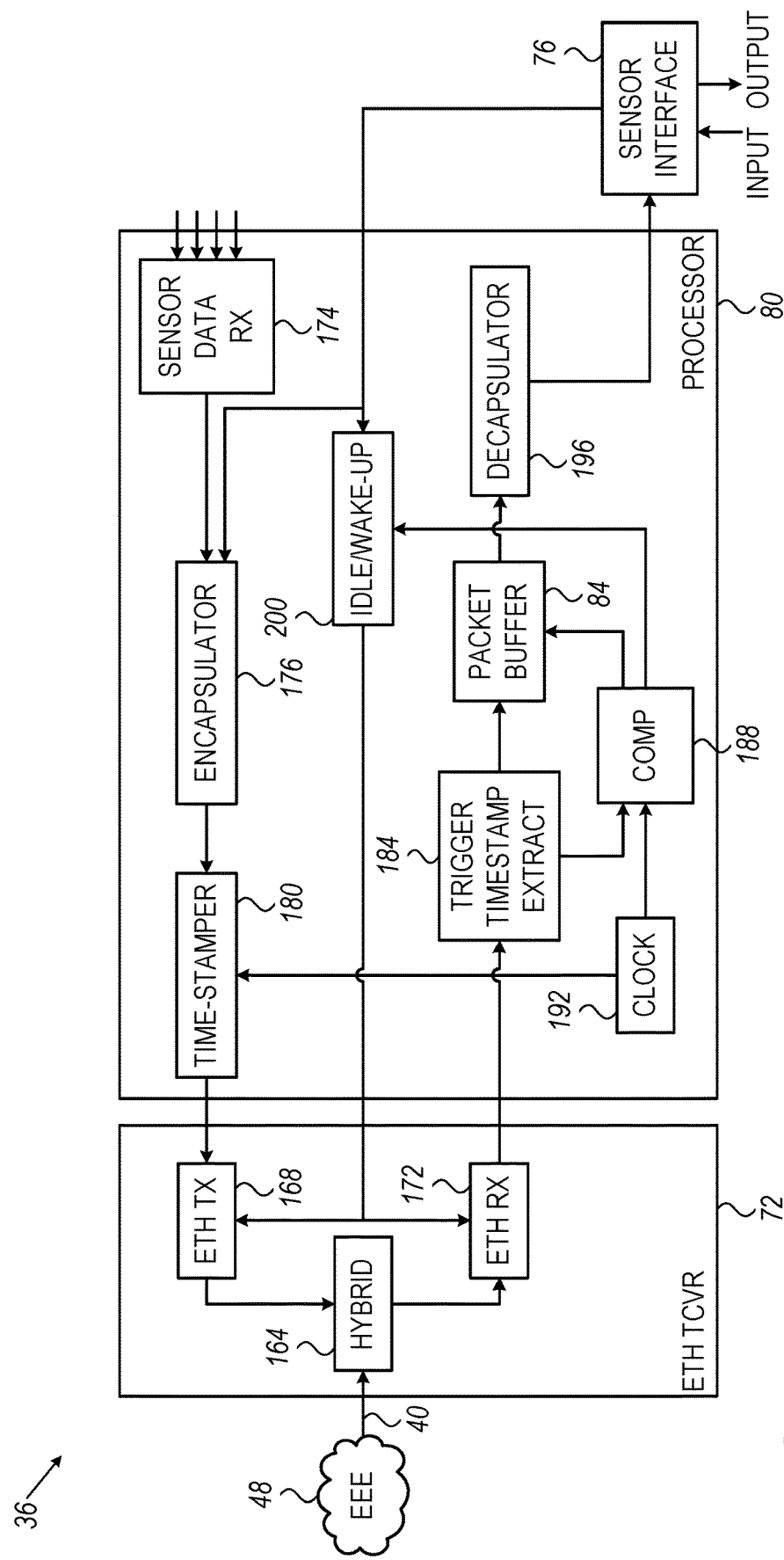
FIG. 4 is a block diagram that schematically illustrates a sensor bridge in the system of FIG. 1, in accordance with an embodiment that is described herein.

FIG. 4 is a block diagram that schematically illustrates sensor bridge 36 of system 20, in accordance with an embodiment that is described herein. In this embodiment, Ethernet transceiver 72 of sensor bridge 36 comprises an Ethernet TX 168 transmits Ethernet signals, an Ethernet RX 172 that receives Ethernet signals, and a hybrid splitter/combiner 164 that couples TX 168 and RX 172 to Ethernet link 40.

For transmission, processor 80 of sensor bridge 36 comprises a sensor data RX 174 that receives sensor data from sensor 28, an encapsulator 176 that encapsulates the sensor data into Ethernet packets, and a time-stamper 180 that time-stamps the Ethernet packets before the packets are transmitted to network 48 using transceiver 72. For reception, processor 80 comprises a trigger-timestamp extractor 184, packet buffer 84, a comparator 188 and a decapsulator 196. Processor 80 further comprises a clock module 192 and an idle/wake-up module 200. Clock module 192 synchronizes processor 80 to the central clock of system 20, e.g., using PTP. Idle/wake-up module 200 activates and deactivates suitable elements of sensor bridge 36, e.g., Ethernet transceiver 72, according to the EEE schedule.

Upon reception, trigger-timestamp extractor 184 extracts the trigger timestamps from received Ethernet packets, and buffers the packets in buffer 84. Comparator 188 compares the trigger times of the various buffered packets (as provided by trigger-timestamp extractor 184) to the current time (as provided by clock module 192). When the current time matches the trigger time of a certain packet (e.g., when the current time is equal to a "delivery time" that slightly precedes the trigger time) comparator 188 retrieves the packet from buffer 84 and sends the packet to decapsulator 196. Decapsulator 196 extracts the control data from the packet, and sends the control data at the specified trigger time via sensor interface 76 to sensor 28.

Figure 5:
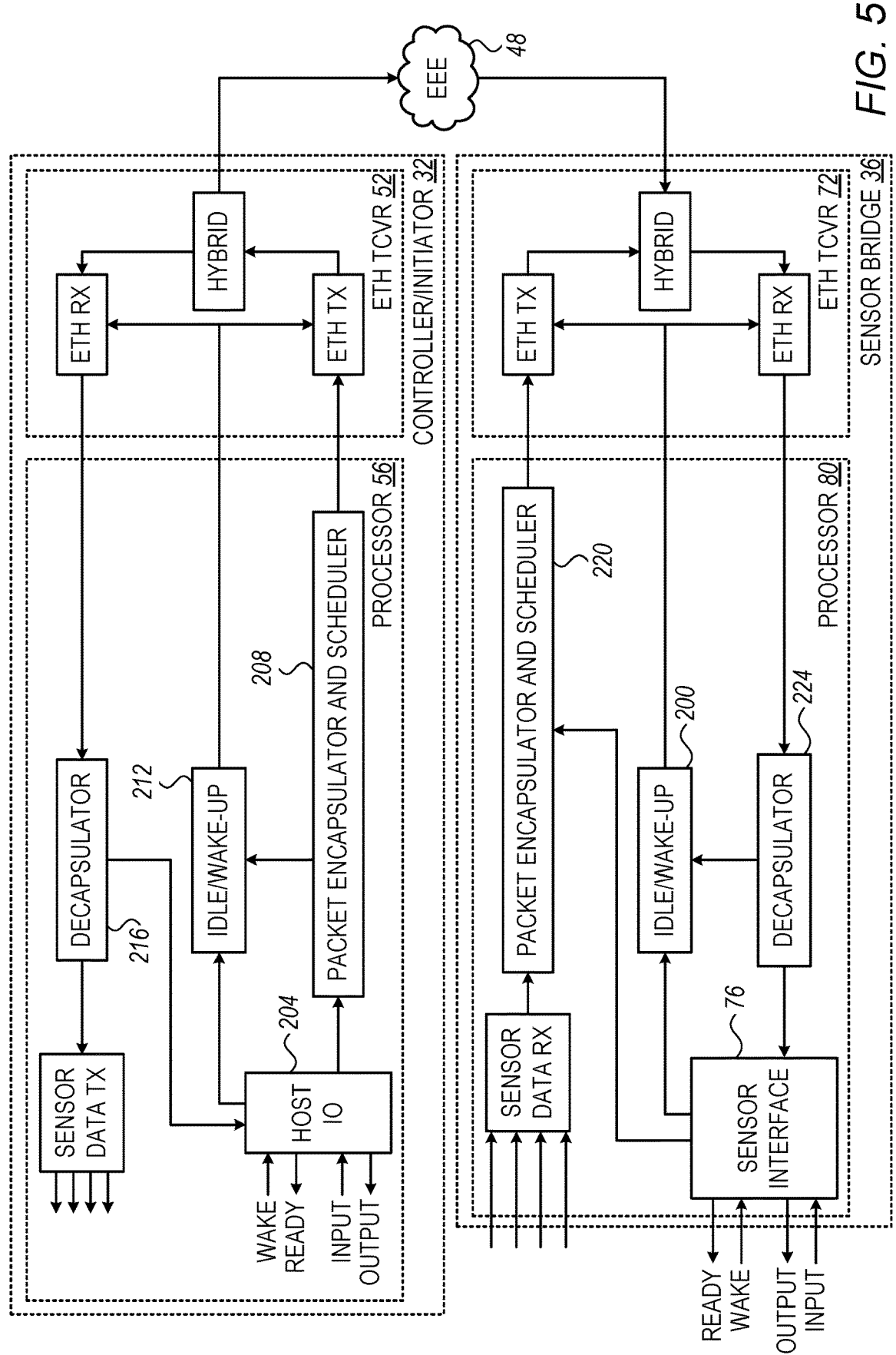
FIG. 5 is a block diagram that schematically illustrates another example implementation of a controller and a sensor bridge in the system of FIG. 1, in accordance with an embodiment that is described herein.

FIG. 5 is a block diagram that schematically illustrates another example implementation of controller 32 and sensor bridge 36 of system 20, in accordance with an embodiment that is described herein.

In this example, processor 56 of controller 32 comprises a host I/O interface 204, which (i) receives control data from a host, for transmission to sensor bridge 36, and (ii) supports a physical signaling mechanism via which a host can activate (wake-up) and deactivate the link with sensor bridge 36 in accordance with EEE. This signaling mechanism can be implemented, for example, using pin-based signaling such as Serial Peripheral Interface (SPI), Universal Asynchronous Receiver Transmitter (UART), I2C or I3C, or any other suitable interface such as PCIe, Universal Serial Bus (BUS) or Ethernet.

Processor 56 further comprises a packet encapsulator and scheduler 208 and an idle/wake-up module 212. Idle/wake-up module 212 wakes-up the link with sensor bridge 36 (the link partner or peer Ethernet device of controller 32 in this context) according to the EEE schedule (as provided by the host via host I/O interface 204). Encapsulator & scheduler 208 (i) encapsulates control data received from the host in Ethernet packets with suitable data timestamps, and (ii) schedules the packets for transmission to network 48 in accordance with the EEE schedule and the signaling from host I/O 204. The WAKE signal is used to schedule EEE for active data mode on network 48 by the host IO interface, and the READY signal is used to inform the host of the EEE timing of network 48.

In some embodiments, encapsulator & scheduler 208 schedules transmission of Ethernet packets using multiple Quality-of-Service (QoS) levels. For example, the host may specify different QoS levels for different control data (e.g., to control data destined to different sensors or sensor types). Encapsulator & scheduler 208 may, for example, give higher scheduling priority to packets that carry control data having a higher QoS level, and vice versa.

Host I/O interface 204 is also connected to a decapsulator 216, which decapsulates Ethernet packets received from sensor bridge 36 before transferring the received sensor data. In addition, decapsulated data can be transferred to an output of host I/O interface 204, and input data can be encapsulated input Ethernet packets by packet encapsulator & scheduler 208. The host I/O interface, thus, provides pin-based methods to control the wake-up times to activate the link to send and receive input and output data at well controlled times.

In some embodiments, sensor interface 76 in sensor bridge 36 also supports a physical signaling interface for activation and deactivation. Sensor bridge 36 in this embodiment comprises a packet encapsulator & scheduler 220 and a decapsulator 224, which both operate in accordance with the EEE schedule and the signaling received via sensor interface 76 in a similar manner to the host interface. Input data to sensor interface 76 can be multiplexed and encapsulated with the sensor data Rx by packet encapsulator and scheduler 220, and output data can be extracted from the packets by decapsulator 224.

Figure 6:
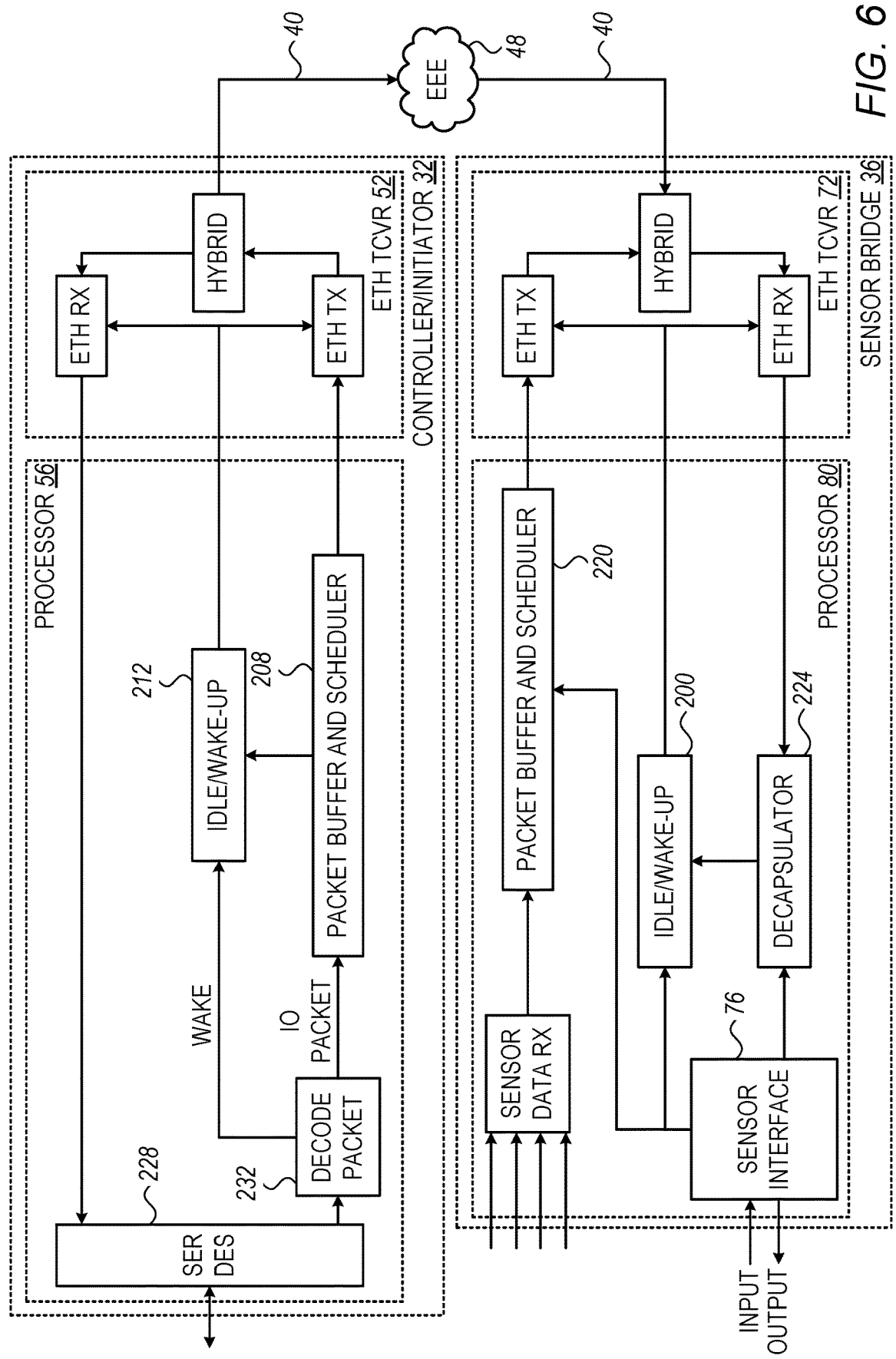
FIG. 6 is a block diagram that schematically illustrates another implementation of a controller and a sensor bridge in the system of FIG. 1, in accordance with an alternative embodiment that is described herein.

FIG. 6 is a block diagram that schematically illustrates another implementation of controller 32 and sensor bridge 36 of system 20, in accordance with an alternative embodiment that is described herein. In this example, communication between controller 32 and the external host in performed using a Serializer-Deserializer (SERDES) 228. Processor 56 typically uses SERDES 228 for receiving both control data and wake-up/idle (activation/deactivation) signaling.

In an example embodiment, processor 56 receives from the host, via SERDES 228, packets that comprise the control data and wake-up/idle signaling. In this embodiment, processor 56 further comprises a packet decoder 232, which decodes the packets received from the host, forwards the control data to packet encapsulator & scheduler 208, and forwards the wake-up/idle signaling to wake-up/idle module 212.

Figure 7:
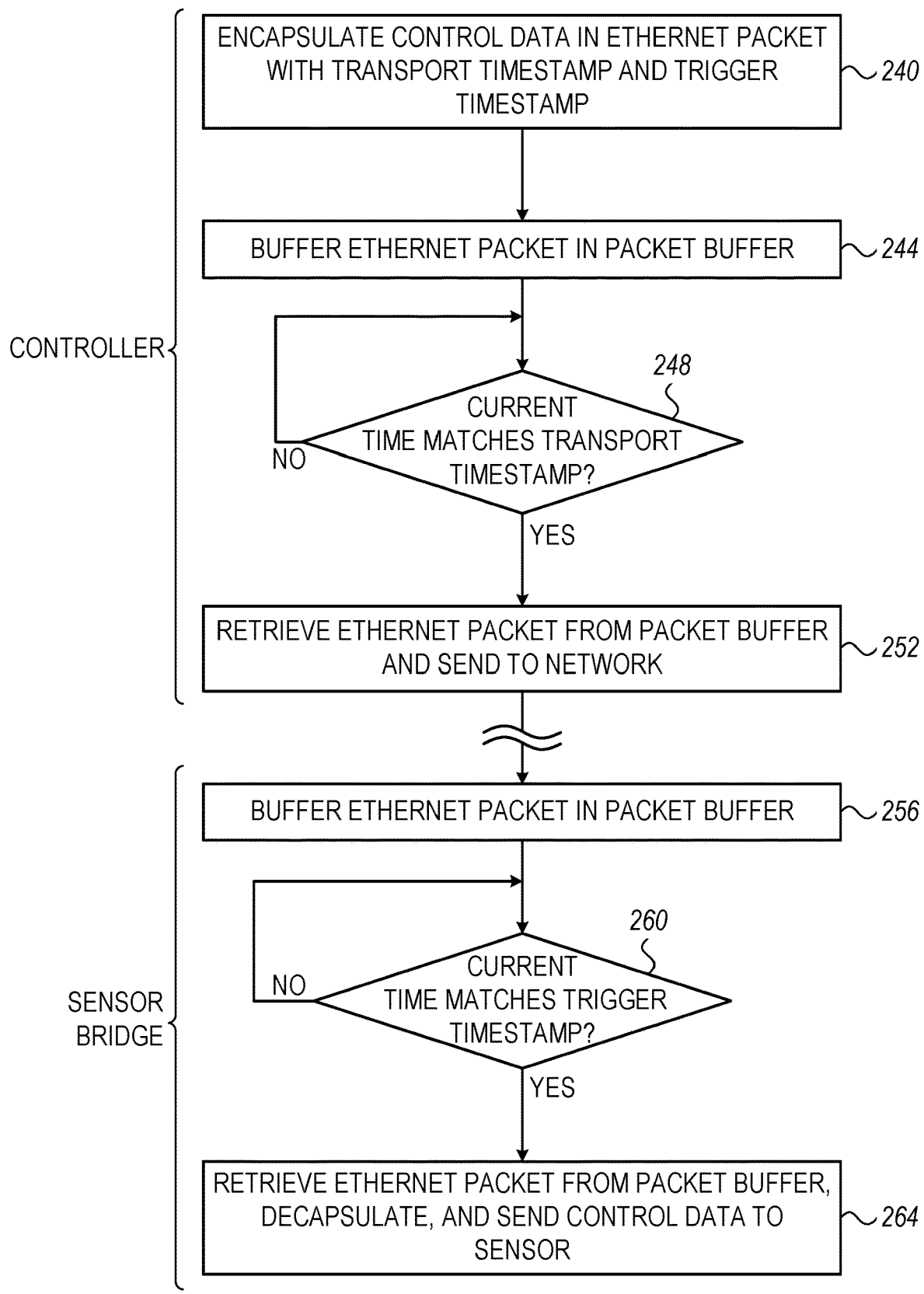
FIG. 7 is a flow chart that schematically illustrates a method for synchronization of sensor control data using transport and trigger timestamps, in accordance with an embodiment that is described herein.

FIG. 7 is a flow chart that schematically illustrates a method for synchronization of sensor control data using transport and trigger timestamps, in accordance with an embodiment that is described herein. The method can be carried out by any of the controllers 32 and sensor bridges 36 described herein.

The method begins with an encapsulation operation 240, in which processor 56 of controller 32 encapsulates control data in an Ethernet packet together with a suitable transport timestamp and a suitable trigger timestamp. At a buffering operation 244, processor 56 buffers the packet in packet buffer 64.

At a transport-time checking operation 248, processor 56 checks whether the current time (e.g., PTP time of system 20) matches (e.g., slightly precedes) the transport time specified in the transport timestamp of the buffered packet. If so, processor 56 retrieves the packet from buffer 64 and sends the packet to network 48 using Ethernet transceiver 52, at a transmission operation 252. Using this technique, the packet is sent to the network at the specified transport time.

The operations up to this point are carried out by controller 32. The operations from this point onwards are carried out by sensor bridge 36, in an embodiment.

At a reception and buffering stage 256, Ethernet transceiver 72 of sensor bridge 36 receives the packet from network 48, and processor 80 of sensor bridge 36 buffers the packet in packet buffer 84.

At a trigger-time checking operation 260, processor 80 checks whether the current time (e.g., PTP time of system 20) matches (e.g., slightly precedes) the trigger time specified in the trigger timestamp of the buffered packet. If so, processor 80 retrieves the packet from buffer 84 and sends the control data to sensor 28 via sensor interface 76, at a delivery operation 264. Using this technique, the control data is provided from the sensor bridge to the sensor at the specified trigger time.

Figure 8:
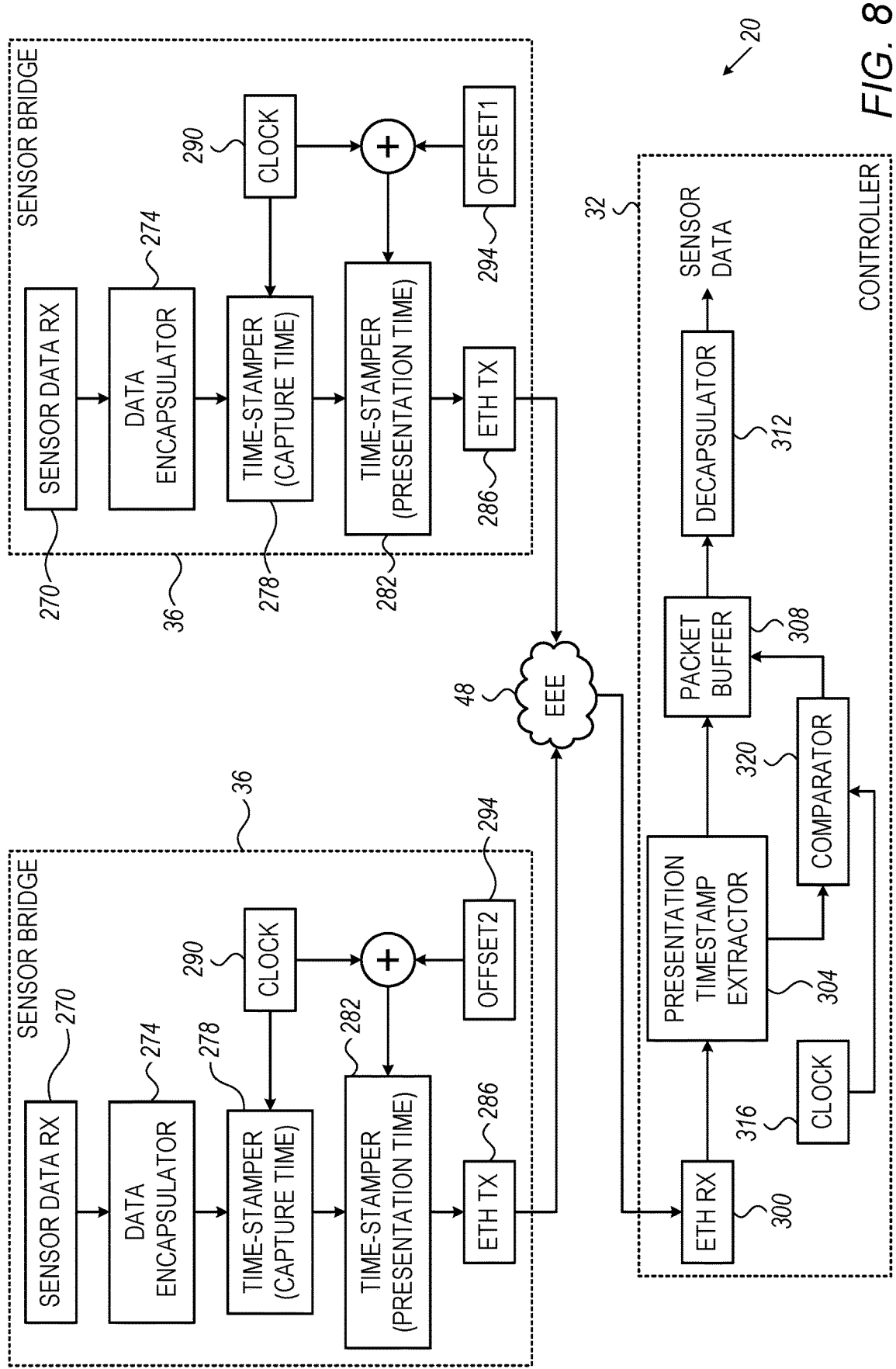
FIG. 8 is a block diagram that schematically illustrates an automotive Ethernet communication system, in accordance with another embodiment that is described herein.

FIG. 8 is a block diagram that schematically illustrates an alternative implementation of automotive Ethernet communication system 20, in accordance with another embodiment that is described herein. The present embodiment focuses on the implementation of the "presentation timestamp" mechanism.

In the example of FIG. 8, system 20 comprises two sensor bridges 36, which serve two sensors (e.g., cameras, not seen in this figure) whose sensor data (e.g., images) has to be presented at the output of controller 32 in synchronization.

In an embodiment, each sensor bridge 36 comprises a sensor data receiver (RX) 270, a data encapsulator 274, a capture-time time-stamper 278, a presentation-time time-stamper 282, an Ethernet transmitter (TX) 286, a clock module 290 and a clock offset module 294. Encapsulator 274 and time-stampers 278 and 282 are typically embodied in processor 80 of sensor bridge 36.

In each sensor bridge 36, clock module 290 synchronizes sensor bridge 36 to the central clock of system 20, e.g., using PTP. Clock offset module 294 adjusts the time provided by clock module 290, by a time offset that may vary from one sensor bridge to another.

In each sensor bridge 36, sensor data RX 270 receives sensor data from the respective sensor. Encapsulator 274 generates Ethernet packets. Capture-time time-stamper 278 adds capture timestamps to the packet. Presentation-time time-stamper 282 adds presentation timestamps to the packets. The capture timestamp in a given packet is indicative of the time at which the sensor captured the sensor data carried by that packet. The presentation timestamp in a given packet is indicative of a future time ("presentation time") at which the sensor data of that packet is to be presented by controller 32 for subsequent processing. Ethernet TX 286 transmits the packets to network 48.

In the embodiment of FIG. 8, controller 32 comprises an Ethernet receiver (RX) 300, a presentation-timestamp extractor 304, a packet buffer 308, a decapsulator 312, a clock module 316 and a comparator 320. Presentation-timestamp extractor 304, buffer 308 and decapsulator 312 are typically embodied in processor 56 of controller 32. Clock module 316 synchronizes controller 32 to the central clock of system 20, e.g., using PTP.

Ethernet RX 300 receives the packets sent from the two sensor bridges 36. Extractor 304 extracts the presentation timestamps from the received packets and buffers the packets in buffer 308. Comparator 320 compares the current time (as provided by clock module 316) to the presentation timestamps of the packets buffered in buffer 308. When the presentation timestamp of a certain buffered packet matches (i.e., slightly precedes) the current time, comparator 320 retrieves the packet from buffer 308 and provides the packet to decapsulator 312. Decapsulator 312 extracts the sensor data and the capture timestamp from the packet, and outputs ("presents") the sensor data and the capture timestamp for subsequent processing.

In the embodiment of FIG. 8, controller 32 is able to synchronize the presentation times of sensor data captured by different sensors and handled by different sensor bridges. Synchronization is maintained both with respect to the presentation times and with respect to the capture times of the data. This ability is important, for example, when presenting image data captured by multiple cameras to systems such as an Advanced Driver Assistance System (ADAS).

Figure 9:
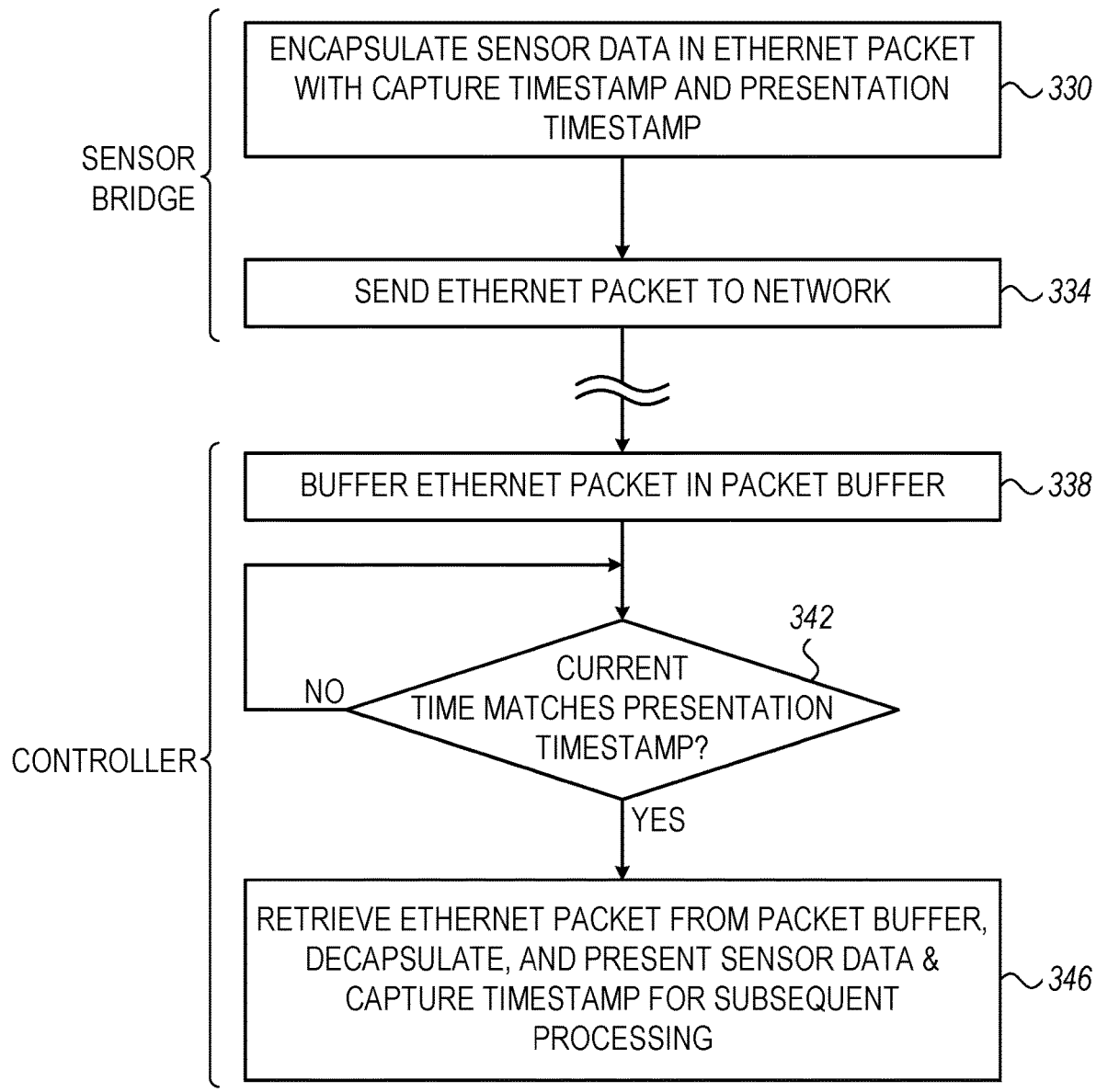
FIG. 9 is a flow chart that schematically illustrates a method for synchronization of sensor data using capture and presentation timestamps, in accordance with an embodiment that is described herein.

FIG. 9 is a flow chart that schematically illustrates a method for synchronization of sensor data using capture and presentation timestamps, in accordance with an embodiment that is described herein. The method may be carried out, for example, by the system of FIG. 8.

The method begins with processor 80 of sensor bridge 36 encapsulating received sensor data in an Ethernet packet, at an encapsulation operation 330. After encapsulation, the Ethernet packet comprises (i) the sensor data, (ii) a capture timestamp, and (iii) a presentation timestamp. At a transmission operation 334, processor 80 sends the packet to network 48 using Ethernet transceiver 72. The packet is destined to controller 32.

At a reception and buffering operation 338, processor 56 of controller 32 receives the packet using Ethernet transceiver 52, and buffers the packet in packet buffer 64.

At a presentation-time checking operation 342, processor 56 checks whether the current time (e.g., PTP time of system 20) matches (e.g., slightly precedes) the presentation time specified in the presentation timestamp of the buffered packet. If so, processor 56 retrieves the packet from buffer 64 and outputs ("presents") the sensor data and the capture timestamp for subsequent processing, at a presentation operation 346. Using this technique, the sensor data and the corresponding capture timestamp are presented at the specified presentation time. The capture timestamp enables the subsequent processing to synchronize sensor data that was captured by different sensors 28.

The configurations of the various systems, controllers and sensor bridges, shown in FIGS. 1-6 and 8, are example configurations that are depicted solely for the sake of clarity. In alternative embodiments, any other suitable configurations can be used. The different elements of the various systems, controllers and sensor bridges described herein may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of the disclosed systems, controllers and sensor bridges, may be implemented in software and/or using a combination of hardware and software elements. Elements that are not mandatory for understanding of the disclosed techniques have been omitted from the figure for the sake of clarity.

In some embodiments, some functions of the disclosed systems, controllers and sensor bridges, e.g., functions of processor 56 and/or processor 80, may be implemented in one or more programmable processors, e.g., one or more Central Processing Units (CPUs), microcontroller and/or Digital Signal Processors (DSPs), which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Although the embodiments described herein mainly address an automotive Ethernet sensor link, the methods and systems described herein can also be used in other applications, such as in communications channels in data centers and industrial applications with highly asymmetrical data.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for controlling a sensor over a network, the apparatus comprising:
   a transceiver, configured to communicate over a network; and
   a processor, configured to:
     receive or generate control data for controlling a sensor, the sensor being connected to the network by a peer device;
     generate a packet comprising (i) the control data, and (ii) a transport timestamp indicative of a future time at which a link with the peer device will be awake; and
     send the packet to the peer device at a transmission time corresponding to the future time.

2. The apparatus according to claim 1, further comprising a memory, wherein the processor is configured to buffer the control data in the memory, and, at the transmission time, retrieve the control data from the memory and send the control data to the peer device.

3. The apparatus according to claim 1, wherein the processor is configured to schedule sending of the packet based on a Quality-of-Service (QoS) metric associated with the control data.

4. The apparatus according to claim 1, wherein the processor is configured to embed a trigger timestamp in the packet, the trigger timestamp indicative of a future time at which the control data is to be provided to the sensor.

5. The apparatus according to claim 1, wherein the network comprises an Ethernet network.

6. A method for controlling a sensor over a network, the method comprising:

receiving or generating control data for controlling a sensor, the sensor being connected to a network by a peer device;

generating a packet comprising (i) the control data, and (ii) a transport timestamp indicative of a future time at which a link with the peer device will be awake; and sending the packet to the peer device at a transmission time corresponding to the future time.

7. The method according to claim 6, further comprising buffering the control data in a memory, and, at the transmission time, retrieving the control data from the memory and sending the control data to the peer device.

8. The method according to claim 6, wherein sending the packet comprises scheduling sending of the packet based on a Quality-of-Service (QoS) metric associated with the control data.

9. The method according to claim 6, wherein sending the packet comprises embedding a trigger timestamp in the packet, the trigger timestamp indicative of a future time at which the control data is to be provided to the sensor.

10. The apparatus according to claim 6, wherein the network comprises an Ethernet network.

* * * * *